(12) United States Patent
Kansanen et al.

(10) Patent No.: US 7,492,844 B2
(45) Date of Patent: Feb. 17, 2009

(54) DATA PROCESSING METHOD, EQUALIZER AND RECEIVER

(75) Inventors: Kimmo Kansanen, Oulu (FI); Tadashi Matsumoto, Oulu (FI)

(73) Assignee: Nokia Corporation, Epsoo (FI)

( * ) Notice: Subject to any disclaimer, the term of this patent is extended or adjusted under 35 U.S.C. 154(b) by 777 days.

(21) Appl. No.: 10/808,554

(22) Filed: Mar. 25, 2004

(65) Prior Publication Data

US 2005/0175131 A1     Aug. 11, 2005

(30) Foreign Application Priority Data

Feb. 6, 2004    (FI) .................................. 20040182

(51) Int. Cl.
*H04B 1/10*    (2006.01)
(52) U.S. Cl. ...................... 375/350; 375/137; 375/149; 375/223; 375/316; 375/348
(58) Field of Classification Search ................. 375/229, 375/346, 348, 350, 147, 223, 29, 135
See application file for complete search history.

(56) References Cited

U.S. PATENT DOCUMENTS

| | | | |
|---|---|---|---|
| 6,622,117 B2 * | 9/2003 | Deligne et al. .............. | 702/190 |
| 6,941,123 B2 * | 9/2005 | Choi et al. ................... | 455/273 |
| 7,113,540 B2 * | 9/2006 | Yousef et al. ................ | 375/233 |
| 2002/0154716 A1 * | 10/2002 | Erving et al. ................ | 375/348 |
| 2005/0013347 A1 * | 1/2005 | Pan et al. ..................... | 375/147 |
| 2005/0175131 A1 * | 8/2005 | Kansanen et al. ........... | 375/350 |
| 2008/0018533 A1 * | 1/2008 | Van Wechel et al. ... | 342/357.12 |

OTHER PUBLICATIONS

Kimmo Kansanen, et al., "A Computationally Efficient MIMO Turbo-Equaliser", IEEE Vehicular Technology Conference, 2003, Apr. 23-25, 2003, vol. 1, pp. 277-281.
Hiroo Omori, et al., "A Matched Filter Approximation for SC/MMSE Iterative Equalizers", IEEE Vehicular Technology Conference, 2001, Oct. 7-11, 2001, vol. 3, pp. 1917-1921.
Mariella Sarestoniemi, et al., "Core Matrix Inversion Techniques for SC/MMSE MIMO Turbo Equalization", IEEE Vehicular Technology Conference, 2004, May 17-19, 2004, vol. 1, pp. 394-398.

* cited by examiner

*Primary Examiner*—Shuwang Liu
*Assistant Examiner*—Hirdepal Singh
(74) *Attorney, Agent, or Firm*—Squire, Sanders & Dempsey LLP

(57) ABSTRACT

The invention is related to an equalizer comprising, for instance: means for creating a first covariance matrix and defining a Cholesky decomposition matrix of an inverse matrix of the first covariance matrix, means for removing selected covariance components from the Cholesky decomposition matrix, means for computing the inverse of a sub-matrix, which represents the common part of the first covariance matrix and a second covariance matrix, which includes covariance estimates of a second observation time, by using the aid of the Cholesky decomposition of the inverse matrix of the first covariance matrix, means for estimating interference from a received signal at a second observation time and determining additional covariance components on the basis of the estimation and means for creating the Cholesky decomposition of the inverse matrix of the second covariance matrix by using unitary rotations.

20 Claims, 2 Drawing Sheets

Figure 3:
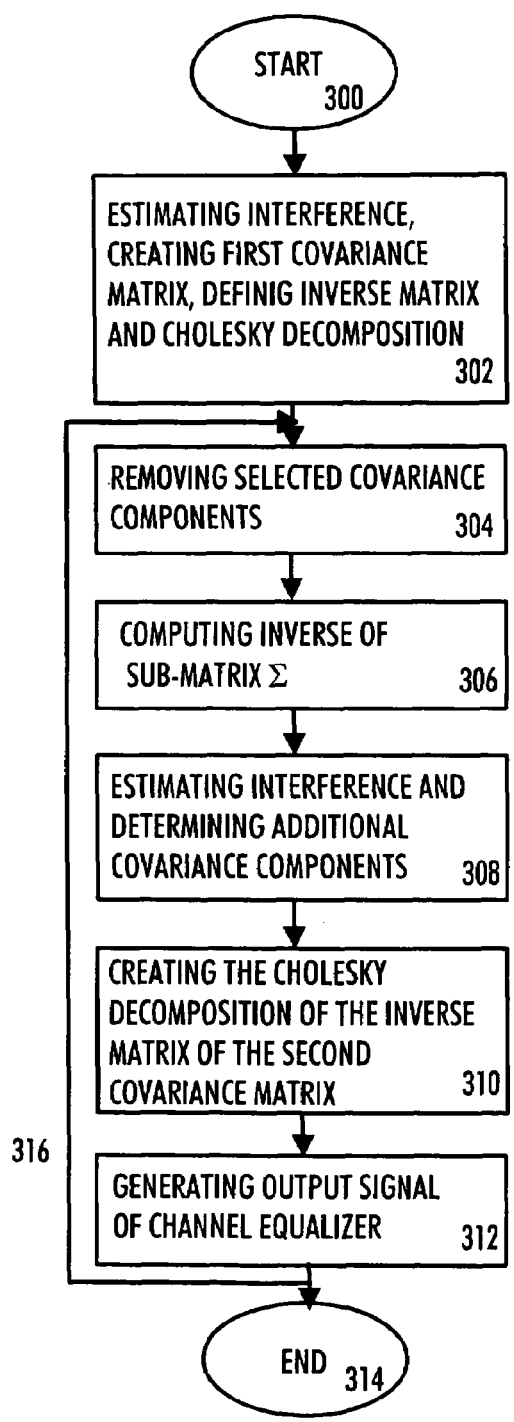

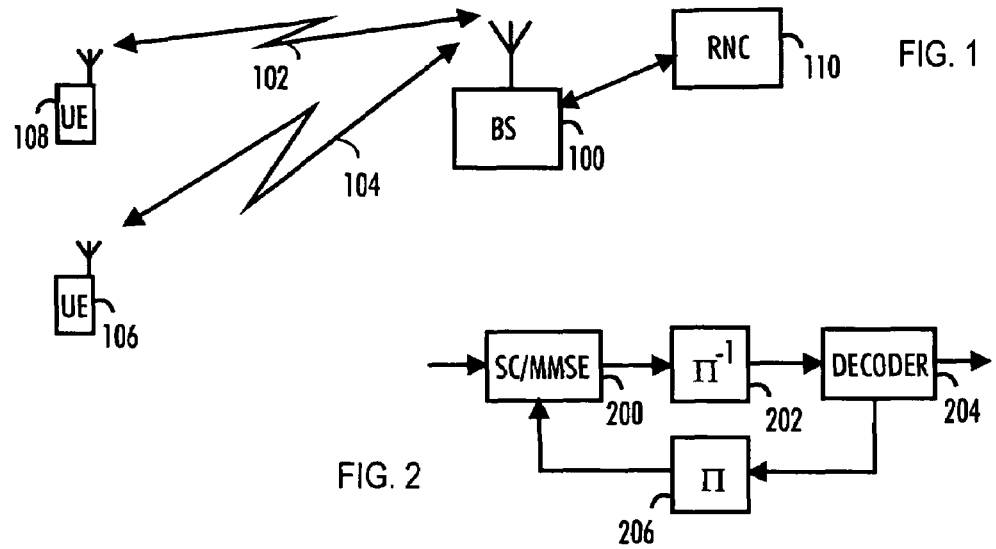
FIG. 1
FIG. 2
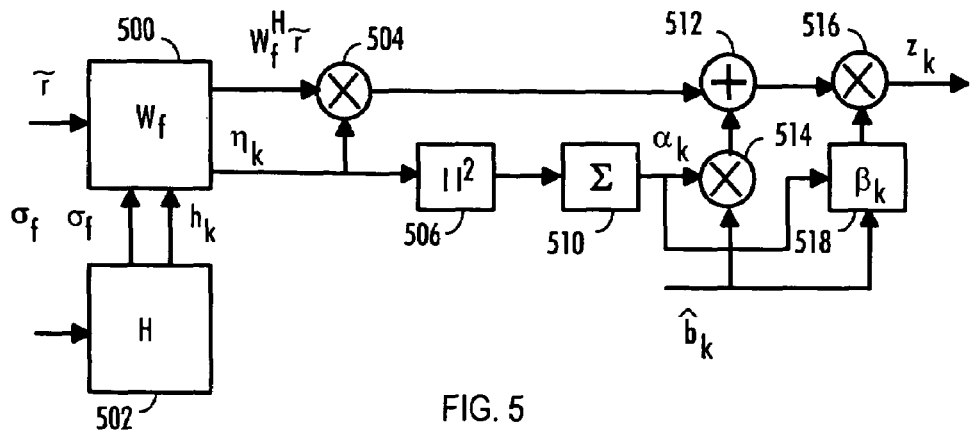
FIG. 5
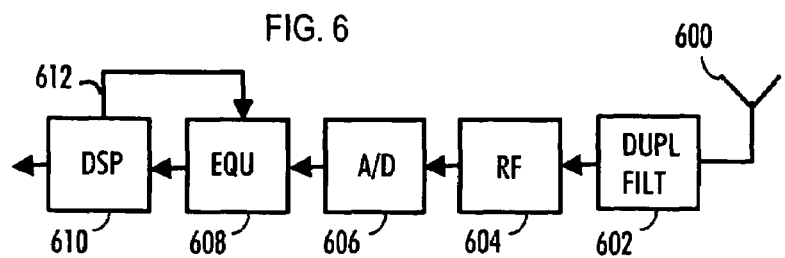
FIG. 6

DATA PROCESSING METHOD, EQUALIZER AND RECEIVER

FIELD

The invention relates to a data processing method in an equalizer of a receiver, an equalizer and a receiver.

BACKGROUND

Transmissions through multi-path channels usually experience inter-symbol interference at a receiver. One of the methods to mitigate the interference is to utilise an equalizer at the receiver to compensate for channel distortion.

Iterative turbo methods have been used for channel equalization where a channel equalizer and a channel decoder exchange information iteratively. One of the methods consists of a soft interference canceller followed by a Minimum mean-square error MMSE filter (SC/MMSE) optimised with the channel decoder feedback, channel response and noise level.

The dominating computational complexity of the SC/MMSE algorithm lies in the computation of the inverse of the interference covariance matrix. The inverse is calculated for each transmitted symbol in the received signal.

BRIEF DESCRIPTION OF THE INVENTION

According to an aspect of the invention, there is provided a data processing method in a channel equalizer of a receiver, comprising: estimating interference from a received signal at a first observation time, creating a first covariance matrix on the basis of the estimation and defining an inverse matrix of the first covariance matrix and a Cholesky decomposition matrix thereof, removing selected covariance components from the Cholesky decomposition matrix, computing the inverse of a sub-matrix, which represents the common part of the first covariance matrix, and a second covariance matrix, which includes covariance estimates of a second observation time, by using the aid of the Cholesky decomposition of the inverse matrix of the first covariance matrix, estimating interference from a received signal at a second observation time and determining additional covariance components on the basis of the estimation, creating the Cholesky decomposition of the inverse matrix of the second covariance matrix by using unitary rotations, generating an output value of the channel equalizer by utilizing information obtained with the aid of the Cholesky decomposition of the inverse matrix of the second covariance matrix.

According to another aspect of the invention, there is provided an equalizer comprising: means for estimating interference from a received signal at a first observation time, creating a first covariance matrix on the basis of the estimation and defining an inverse matrix of the first covariance matrix and a Cholesky decomposition matrix thereof, means for removing selected covariance components from the Cholesky decomposition matrix, means for computing the inverse of a sub-matrix, which represents the common part of the first covariance matrix, and a second covariance matrix, which includes covariance estimates of a second observation time, by using the aid of the Cholesky decomposition of the inverse matrix of the first covariance matrix, means for estimating interference from a received signal at a second observation time and determining additional covariance components on the basis of the estimation, means for creating the Cholesky decomposition of the inverse matrix of the second covariance matrix by using unitary rotations, means for generating an output value of the channel equalizer by utilizing information obtained with the aid of the Cholesky decomposition of the inverse matrix of the second covariance matrix.

According to another aspect of the invention, there is provided a receiver comprising: means for estimating interference from a received signal at a first observation time, creating a first covariance matrix on the basis of the estimation and defining an inverse matrix of the first covariance matrix and a Cholesky decomposition matrix thereof, means for removing selected covariance components from the Cholesky decomposition matrix, means for computing the inverse of a sub-matrix, which represents the common part of the first covariance matrix, and a second covariance matrix, which includes covariance estimates of a second observation time, by using the aid of the Cholesky decomposition of the inverse matrix of the first covariance matrix, means for estimating interference from a received signal at a second observation time and determining additional covariance components on the basis of the estimation, means for creating the Cholesky decomposition of the inverse matrix of the second covariance matrix by using unitary rotations, means for generating an output value of the channel equalizer by utilizing information obtained with the aid of the Cholesky decomposition of the inverse matrix of the second covariance matrix.

According to another aspect of the invention, there is provided an equalizer configured to: estimate interference from a received signal at a first observation time, creating a first covariance matrix on the basis of the estimation and defining an inverse matrix of the first covariance matrix and a Cholesky decomposition matrix thereof, remove selected covariance components from the Cholesky decomposition matrix, compute the inverse of a sub-matrix, which represents the common part of the first covariance matrix, and a second covariance matrix, which includes covariance estimates of a second observation time, by using the aid of the Cholesky decomposition of the inverse matrix of the first covariance matrix, estimate interference from a received signal at a second observation time and determining additional covariance components on the basis of the estimation, create the Cholesky decomposition of the inverse matrix of the second covariance matrix by using unitary rotations, generate an output value of the channel equalizer by utilizing information obtained with the aid of the Cholesky decomposition of the inverse matrix of the second covariance matrix.

According to another aspect of the invention, there is provided a receiver configured to: estimate interference from a received signal at a first observation time, creating a first covariance matrix on the basis of the estimation and defining an inverse matrix of the first covariance matrix and a Cholesky decomposition matrix thereof, remove selected covariance components from the Cholesky decomposition matrix, compute the inverse of a sub-matrix, which represents the common part of the first covariance matrix, and a second covariance matrix, which includes covariance estimates of a second observation time, by using the aid of the Cholesky decomposition of the inverse matrix of the first covariance matrix, estimate interference from a received signal at a second observation time and determining additional covariance components on the basis of the estimation, create the Cholesky decomposition of the inverse matrix of the second covariance matrix by using unitary rotations, generate an output value of the channel equalizer by utilizing information obtained with the aid of the Cholesky decomposition of the inverse matrix of the second covariance matrix.

Embodiments of the invention are described in the dependent claims.

The method and system of the invention provide several advantages. An embodiment of the invention offers an efficient method for computing a matrix inversion in an equalizer. The embodiment can be implemented by a pipelined, parallel arrangement with, for instance, one or more systolic arrays.

LIST OF DRAWINGS

Figure 4:
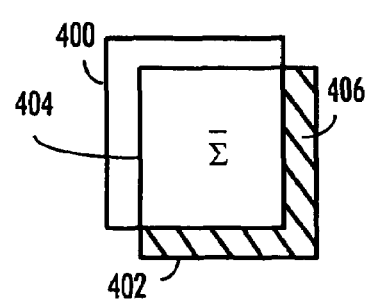

In the following, the invention will be described in greater detail with reference to the embodiments and the accompanying drawings, in which FIG. 1 shows an example of a communication system, FIG. 2 is a flow chart, FIG. 3 shows an example of the SC/MMSE turbo receiver structure, FIG. 4 illustrates a sub-matrix including the common part of two consecutive covariance matrices, FIG. 5 is a block diagram of an equalizer and FIG. 6 is a block diagram of a receiver.

DESCRIPTION OF EMBODIMENTS

With reference to FIG. 1, we examine an example of a data transmission system in which the embodiments of the invention can be applied. The present invention can be applied in various wireless communication systems. One example of such communication system is a UMTS (Universal Mobile Telecommunications System) radio access network. It is a radio access network, which includes WCDMA (wideband code division multiple access) technology and can also offer real-time IP-based (Internet Protocol) services, which are, for example, IP telephony (IPT), IP-based streaming and IP-multimedia via a connection to an IP-network. The embodiments are not, however, restricted to the system given as an example but a person skilled in the art may apply the solution in other radio systems provided with the necessary properties.

It is clear to a person skilled in the art that the method according to the invention can be applied to systems utilizing different modulation methods or air interface standards.

FIG. 1 is a simplified illustration of a digital data transmission system to which the solution according to the invention is applicable. This is a part of a cellular radio system, which comprises a base station (or a node B) 100, which has bi-directional radio links 102 and 104 to subscriber terminals 106 and 108. The subscriber terminals may be fixed, vehicle-mounted or portable. The base station includes transmitters, for instance. From the transceivers of the base station there is a connection to an antenna unit, which establishes the bi-directional radio links to the subscriber terminal. The base station is further connected to a radio network controller 110, which transmits the connections of the terminals to the other parts of the network. The base station controller controls in a centralized manner several base stations connected to it.

The cellular radio system can also communicate with other networks, such as a public switched telephone network or the Internet.

It is possible to apply the turbo principle to many detection/decoding problems such as channel estimation, channel equalization, detection of coded modulation, multi-user detection and channel decoding. The example depicted here in further detail in FIG. 2 is related to equalization. Equalization is required because of inter-symbol interference (ISI) resulting from multi-path propagation.

The equalizer depicted as an example here, comprises a soft interference canceller (SC) followed by an MMSE filter (Minimum-Mean-Square Equalizer) optimised with the channel decoder feedback, channel response and noise level. The SC/MMSE equalizer uses information on transmitted bits.

The principle of turbo equalization applied to the usage of SC/MMSE algorithm leads to a structure where the likelihood information is exchanged between SC/MMSE equalizer and a decoder through the interleaving/de-interleaving blocks. The SC/MMSE turbo receiver structure can be applied not only the equalization of inter-symbol interference for single-carrier signalling but also to various other signalling schemes, such as multiple signal detection in multiple-input-multiple-output (MIMO) systems.

An example of the SC/MMSE turbo receiver structure is shown in FIG. 2. The SC/MMSE equalizer 200 is coupled to the channel decoder 204 via a de-interleaver 202. The decoder 204 feeds back a priori information on the value of transmitted symbols to the SC/MMSE equalizer via an interleaver 206. The method is used in a channel equalizer. The arrows passing between the equalizer 200 and decoder 204 through the interleaver 206 and de-interleaver 202 illustrate the exchange of likelihood information.

The decoder 204 can in general be any algorithm capable of providing soft symbol information metrics also called symbol decisions, data decisions or symbol estimates, for instance. Possible decoder algorithms are, for instance, log-domain maximum-a-posteriori (log-MAP), its max-approximation (max-log-MAP) and the soft-output Viterbi algorithm (SOVA).

The embodiment of a data processing method in a channel equalizer of a receiver utilises the fact that two consecutive covariance matrices called in this application a first covariance matrix and a second covariance matrix include mostly the same components. The second covariance matrix at the time n+1 is a shifted version of the previous (first) covariance matrix at the time n with new components only in the last row and column. The approach is especially useful in MIMO systems, where multiple desired symbol likelihood information is computed with a common interference covariance matrix but different channel responses. The equalizer operates with a sliding signal window, and the interference cancelled signal covariance matrix can be recursively updated by exploiting the knowledge of the memory within the sliding window. The size of a sliding step is usually one.

Typically, as far as the equalizing process continues, the sliding of the signal window continues and the inversion of a new covariance matrix is calculated with the aid of the previous inverse covariance matrix utilising common covariance components.

In cases where the received signal is over-sampled in space or time, the covariance matrix has a block structure. The recursion must then be executed multiple times per each equalized symbol to match the over-sampling ratio.

The embodiment begins in block 300. The embodiment is suitable especially for systems where multiple antennas transmit a coded and interleaved signal, which is received with one of multiple antennas. In block 302, interference in a radio channel is estimated. The interference estimation is known in the art and it is therefore not explained here in further detail. One widely used method is measuring the impulse response of a received signal. If there are several radio channels of interest, the interference is usually estimated in these channels. In a multi-user system, the interference can be estimated for every user in a multi-user system or a common interference estimate is used. In the example used here, the received signal is modelled with the linear model:

$$r = Hb + w, \quad (1)$$

where
H is a channel response matrix,
b is a symbol vector,
w is a noise vector.

On the basis of the interference estimation, a first covariance matrix is created. The size of the matrix depends on the amount of receiver sampling and the channel response length. The system may be a MIMO (Multiple input, multiple output) system, in which case there are several simultaneous radio transmissions to be received through different channels.

In block 302, an inverse matrix of the first covariance matrix and its Cholesky decomposition are also defined. The inverse matrix of the first covariance matrix can be calculated using exhaustive calculation used in prior art equalizers or another prior art method.

The inverse matrix of the first covariance matrix can be partitioned as follows:

$$U(n) = \begin{pmatrix} u_p & u_p^H \\ u_p & U_p \end{pmatrix},$$  (2)

where
$u_p$ means a scalar,
$u_p$ means a vector,
$u_p^H$ means a complex-conjugate transpose vector,
$U_p$ means a sub-matrix and
H means a complex-conjugate transpose (Hermitian) matrix.

The Cholesky decomposition of the partitioned inverse matrix (2) is defined as a lower-triangular matrix:

$$W_p = \begin{pmatrix} \omega_p & \overline{o}^H \\ \omega_p & \Omega_p \end{pmatrix},$$  (3)

where
$\omega_p$ means a scalar,
$\omega_p$ means a vector,
$\overline{o}^H$ means a zero vector and
$\Omega_p$ means a lower triangular sub-matrix,
H means a complex-conjugate transpose (Hermitian) matrix.

In block 304, selected covariance components are removed from the Cholesky decomposition matrix. The covariance components to be removed are typically components related to the observation time of the previous covariance matrix.

In block 306, the inverse of the sub-matrix $\Sigma$ is computed. The sub-matrix $\Sigma$ represents the common part of the first covariance matrix and a second covariance matrix, which includes covariance estimates of a second observation time, by using the aid of the Cholesky decomposition of the inverse matrix of the first covariance matrix.

Two consecutive covariance matrices called in this application a first covariance matrix and a second covariance matrix include mostly the same components. The second covariance matrix at the time n+1 is a shifted version of the previous (first) covariance matrix at the time n with new components only in the last row and column.

The sub-matrix $\Sigma$ representing the common part of the two consecutive covariance matrices is clarified with the aid of FIG. 4. The first covariance matrix is marked with number 400 and the second covariance matrix is marked with number 402. The sub matrix $\Sigma$ which represents the common part of matrices 400 and 402 is marked with number 404.

The Cholesky factorisation of the inverse matrix $\Sigma^{-1}$ can be computed as:

$$\Sigma^{-1} = \overline{\Omega}\overline{\Omega}^H,$$  (4)

where
$\overline{\Omega}$ is a sub-matrix and
$\overline{\Omega}^H$ is a complex-conjugate transpose of the sub-matrix.
We find that $$\overline{\Omega} = \Omega_p,$$  (5)

where
$\Omega_p$ is a sub-matrix of (3).

In block 308, interference from a received signal is estimated at a second observation time and additional covariance components are determined on the basis of the estimation. The additional covariance components are the covariance components of the part of the second covariance matrix 402 of FIG. 4 not common with two consecutive matrices, that is to say they do not belong to the sub-matrix $\Sigma$. The location of the additional covariance components is marked in FIG. 4 with reference number 406. The additional covariance components can be computed for upright part components and then derive the horizontal part components with the aid of upright components.

Hence the additional covariance components can be computed as $$\begin{pmatrix} \sigma_f \\ \sigma_f \end{pmatrix} = \left( H(n) \left[ diag\left(1 - \hat{b}^2(n)\right) \right] H^H(n) + I\delta_0^2 \right) \begin{pmatrix} 0 \\ 1 \end{pmatrix},$$  (6)

where
$\sigma_f$ means covariance component vector,
$\sigma_f$ means covariance component (scalar) (located in the corner of the second covariance matrix),
H(n) means system matrix in the observation time of the second covariance matrix,
diag means a diagonal matrix,
$\hat{b}(n)$ is a symbol estimate,
H means a complex conjugate (Hermitian) matrix,
$\sigma_0^2$ is the noise variance,
I is an interference matrix.

The computation of new covariance components in (6) is defined for BPSK modulation. The extension of the computation to other modulation methods can be implemented by known methods.

In block 310, Cholesky decomposition of the inverse matrix of the second covariance matrix is created by using unitary rotations.

The Cholesky factorisation of the inverse matrix of the second covariance matrix is defined as a lower-triangular matrix:

$$W_f = \begin{pmatrix} \Omega_f & \overline{o}^H \\ \omega_f^H & \omega_f^* \end{pmatrix},$$  (7)

where
$\Omega_f$ means a lower triangular sub-matrix,
$\omega_f^H$ means a vector,
$\overline{o}^H$ means a zero vector,
$\omega_f^*$ means a scalar,
H means a complex-conjugate transpose (Hermitian) matrix and
* means a complex-conjugate.

A pre-array is composed with the additional covariance components $\sigma_f$, $\sigma_f$ which are pre-processed with the prior sub-matrix $\overline{\omega}$. By unitary rotations, it is possible to iteratively annihilate the last column of the pre-array. If the dimension of the matrix $W_f$ is d, d−1 rotations are needed to annihilate all but the last element of the last column of the pre-array. Thus the Cholesky factorisation of the inverse matrix of the second covariance matrix can be expressed with the pre-array and a concatenated rotation matrix as:

$$W_f = \begin{pmatrix} \overline{\Omega} & -\sqrt{u_f}\,\overline{\Omega\Omega}^H \sigma_f \\ \overline{\sigma}^H & \sqrt{u_f} \end{pmatrix} \Theta, \quad (8)$$

where
$\overline{\omega}$ means a sub-matrix,
$\overline{\sigma}^H$ means a zero vector,
$\overline{\omega}^H$ means a complex-conjugate transpose of the sub-matrix,
$u_f = (\sigma_f - \sigma_f^H \overline{\omega \omega}^H \sigma_f)$,
$\sigma_f$ means covariance component (scalar),
$\Theta$ means series of unitary rotations and
H means a complex-conjugate transpose (Hermitian) matrix.

Algorithms based on unitary rotation are well-suited for pipelined and parallel implementations with, for instance, systolic arrays.

In block 312, an output value of the channel equalizer is generated by utilizing information obtained with the aid of the Cholesky decomposition of the inverse matrix of the second covariance matrix. The output value of the channel equalizer is typically generated by further utilizing a-priori symbol estimate information. The a-priori symbol estimate information may include, for instance, symbol decisions (also called, for instance, likelihood information, symbol estimate, data decision).

The output of an equalizer can be defined as:

$$z_k(n) = \beta_k(n)(\alpha_k(n)\hat{b}_k(n) + \eta_k^H(n)W_f^H \tilde{r}(n)), \quad (9)$$

where $$\alpha_k(n) = \eta_k^H(n)\eta_k(n), \quad (10)$$

$$\eta_k(n) = W_f^H h_k(n), \quad (11)$$

$$\beta_k(n) = 1 - \frac{\alpha_k(n)}{\alpha_k(n) + |\hat{b}_k(n)|^{-2}}, \quad (12)$$

$h_k(n)$ is a channel response vector,
n means an nth symbol,
H means a complex-conjugate transpose (Hermitian) matrix,
$\hat{b}_k(n)$ is a symbol estimate (or a symbol decision, likelihood information, symbol estimate or a data decision) based on a channel decoder feedback,
$W_f$ is defined in the form (8), $$\tilde{r}(n) = r(n) - H\hat{b} \quad (13)$$

where
$H_k(n)$ is a channel response matrix and
n means an nth symbol.

The computation in (9)-(12) is defined for BPSK modulation. The extension of the computation to other modulation methods can be carried out by known methods The embodiment ends in block 314. Arrow 316 depicts that the embodiment may be repeated for calculating the next equalizer output signal value usually for the next transmitted symbol.

In FIG. 5, there is depicted a generalised example of an equalizer. It is obvious to a person skilled in the art that the equalizer may also include elements other than those illustrated in FIG. 5. Equalizers are typically part of receivers. The receiver may be located in several kinds of communication units, such as a base station of a communication system, for instance a base station used in a wideband code division multiple access system (WCDMA), such as UMTS (universal mobile telecommunications system).

Channel matrix H is estimated with a channel estimator and required channel response values $h_k$ are conveyed from block 502 to block 500 along with new (additional) covariance matrix components $\sigma_f$, $\sigma_f$. In block 500 the Cholesky factorisation of the inverse matrix of the second covariance matrix is calculated according to equation (8). The output values of the block 500 are the vectors $\eta\square_k$ and $W_f^H \tilde{r}$ where $()^H$ means complex-conjugate transpose and is $\tilde{r}(n) = r(n) - H\hat{b}$, which means a received signal from where known signal components have been removed.

In multiplier 504, $\eta_k(n)$ and $W_f^H \tilde{r}(n)$ are multiplied element-wise. Squaring block 506 and adder 510 correspond to the calculation of $\eta_k^H(n)\eta_k(n)$, which gives $\alpha_k(n)$ according to equation (10).

In multiplier 514, $\alpha_k(n)$ is multiplied with $\hat{b}_k(n)$, which is a symbol estimate based on channel decoder 204 feedback depicted in FIG. 2. Then the result of the multiplication is added to $\eta_k^H W_f^H \tilde{r}(n)$ in adder 512.

In block 518, $\beta_k(n)$ is calculated according to equation (12). The output of the adder 512 and $\beta_k(n)$ are multiplied in multiplier 516 and the output of the equalizer is then $z_k(n) = \beta_k(n)(\alpha_k(n)\hat{b}_k(n) + \eta_k^H(n)W_f^H \tilde{r}(n))$ according to equation (9). When multiple transmitters are received, $h_k(n)$, $\eta_k$, $\alpha_k(n)$ $\beta_k(n)$ and $z_k(n)$ must be computed separately for each transmitter.

FIG. 6 shows a generalised example of a receiver. It is obvious to a person skilled in the art that the receiver may also include elements other than those illustrated in FIG. 6. The receiver may be located in several elements of a communication system, such as in a base station. In this example, the receiver uses the same antenna 600 as a transmitter, and therefore there is also a duplex filter 602 to separate transmission and reception. The antenna may be an antenna array or a single antenna. In the receiver, RF-parts 604 in this case also comprise a power amplifier, which amplifies the received signal attenuated on a radio path. Typically RF-parts down-convert a signal to an intermediate frequency and then to a base band frequency or straight to the base band frequency. The analogue-to-digital converter 606 converts an analogue signal to digital form by sampling and quantizing.

The equalizer 608 carries out most processing steps of embodiments of the data processing method. The structure of the block is described in FIG. 5 in general. Arrow 612 depicts that symbol estimates from a channel decoder are fed to equalizer 608. In this embodiment, the channel decoder is a part of DSP block 610. Typical functions of a DSP-block are, for example, de-scrambling, decoding, de-interleaving, etc. The basics of the digital signal processing are known in the art. The equalizer may also include means for channel estimation. The interleaver and de-interleaver are not depicted in FIG. 6 for the sake of clarity.

The embodiments of the data processing method are typically implemented as a processor and software, but different hardware implementations are also feasible, e.g. a circuit built of separate logics components or one or more client-specific integrated circuits (Application-Specific Integrated Circuit, ASIC). A hybrid of these implementations is also feasible. Additionally, unitary rotations can be implemented with systolic arrays.

Even though the invention is described above with reference to an example according to the accompanying drawings, it is clear that the invention is not restricted thereto but it can be modified in several ways within the scope of the appended claims.

The invention claimed is:

1. A method, comprising:
estimating interference from a received signal at a first observation time, creating a first covariance matrix on a basis of the estimating and defining an inverse matrix of the first covariance matrix and a Cholesky decomposition matrix;
removing selected covariance components from the Cholesky decomposition matrix;
computing an inverse of a sub-matrix, which represents a common part of the first covariance matrix and a second covariance matrix, which includes covariance estimates of a second observation time, by using an aid of a Cholesky decomposition of the inverse matrix of the first covariance matrix;
estimating interference from a received signal at the second observation time and determining additional covariance components on a basis of the estimating;
creating a Cholesky decomposition of an inverse matrix of the second covariance matrix by using unitary rotations; and
generating an output value of a channel equalizer by utilizing information obtained with an aid of the Cholesky decomposition of the inverse matrix of the second covariance matrix.

2. The method of claim 1, further comprising filtering additional covariance components.

3. The method of claim 1, further defining the Cholesky decomposition of the inverse matrix of the first covariance matrix of a form $$W_p = \begin{pmatrix} \omega_p & \overline{o}^H \\ \omega_p & \Omega_p \end{pmatrix},$$

where $\omega_p$ is a scalar, $\omega_p$ is a vector, $\overline{o}^H$ is a zero vector and $\Omega_p$ is a lower triangular sub-matrix.

4. The method of claim 1, further comprising partitioning the inverse matrix of the first covariance matrix as $$U(n) = \begin{pmatrix} u_p & u_p^H \\ u_p & U_p \end{pmatrix},$$

wherein $u_p$ is a scalar, $u_p$ is a vector, $u_p^H$ is a complex-conjugate transpose vector, $U_p$ is a sub-matrix and H is a complex-conjugate transpose matrix.

5. The method of claim 1, wherein a selection of the covariance components to be removed is based on a size of a sliding step of a signal window.

6. The method of claim 1, further comprising determining additional covariance components as $$\begin{pmatrix} \sigma_f \\ \sigma_f \end{pmatrix} = \left( H(n)\left[ diag\left(1 - \hat{b}^2(n)\right)\right]H^H(n) + I\delta_0^2\right)\begin{pmatrix} 0 \\ 1 \end{pmatrix},$$

wherein $\sigma_f$ is covariance component vector, $\sigma_f$ is a covariance component located in a corner of the second covariance matrix, H(n) is a system matrix in the second observation time, diag is a diagonal matrix, $\hat{b}(n)$ is a symbol estimate, H is a complex conjugate matrix, $\sigma_0^2$ is a noise variance, and I is an interference matrix.

7. The method of claim 1, further comprising defining the computation of the inverse of the sub-matrix $\Sigma$ representing the common part of the two consecutive covariance matrices with an aid of determination $\Sigma^{31\ 1} = \overline{\Omega\Omega}^H$, wherein $\overline{\Omega}$ is a sub-matrix and $\overline{\Omega}^H$ is a complex-conjugate transpose of the sub-matrix.

8. The method of claim 1, further comprising defining Cholesky factorisation of the inverse matrix of the second covariance matrix as $$W_f = \begin{pmatrix} \overline{\Omega} & -\sqrt{u_f}\,\overline{\Omega\Omega}^H \sigma_f \\ \overline{o}^H & \sqrt{u_f} \end{pmatrix}\Theta,$$

wherein $\overline{\Omega}$ is a sub-matrix, $\overline{o}^H$ is a zero vector, $\overline{\Omega}^H$ is a complex-conjugate transpose of a sub-matrix, $u_f = (\sigma_f - \sigma_f^H \overline{\Omega\Omega}^H \sigma_f)$, $\sigma_f$ is a covariance component, $\Theta$ is a series of unitary rotations and H is a complex-conjugate transpose matrix.

9. The method of claim 1, wherein an output signal of an equalizer is generated as follows:

$$z_k(n) = \beta_k(n)\left(\alpha_k(n)\hat{b}_k(n) + \eta_k^H(n)W_f^H \tilde{r}(n)\right)$$

wherein $\alpha_k(n) = \eta_k^H(n)\eta_k(n)$, $$\eta_k(n) = W_f^H h_k(n),\ \beta_k(n) = 1 - \frac{\alpha_k(n)}{\alpha_k(n) + |\hat{b}_k(n)|^{-2}},$$

$h_k(n)$ is a channel response vector, n is an nth symbol, H is a complex-conjugate transpose matrix, $\hat{b}_k(n)$ is a symbol estimate based on a channel decoder feedback, $$W_f = \begin{pmatrix} \overline{\Omega} & -\sqrt{u_f}\,\overline{\Omega\Omega}^H \sigma_f \\ \overline{o}^H & \sqrt{u_f} \end{pmatrix}\Theta$$

wherein $\overline{\Omega}$ is a sub-matrix, $\overline{o}^H$ is a zero vector, $\overline{\Omega}^H$ is a complex-conjugate transpose of a sub-matrix, $u_f = (\sigma_f - \sigma_f^H \overline{\Omega\Omega}^H \sigma_f)$, $\sigma_f$ is a covariance component, $\Theta$ is a series of unitary rotations and H is a complex-conjugate transpose matrix, $\tilde{r}(n) = r(n) - H\hat{b}$ where $H_k(n)$ is a channel response matrix and n means an nth symbol.

10. The method of claim 1, wherein the output value of the channel equalizer is generated by further utilizing a-priori symbol estimate information.

11. An apparatus, comprising:
a first estimator configured to estimate interference from a received signal at a first observation time, create a first covariance matrix on a basis of the estimating and define an inverse matrix of the first covariance matrix and a Cholesky decomposition matrix;
a remover configured to remove selected covariance components from the Cholesky decomposition matrix;
a processor configured to compute an inverse of a sub-matrix, which represents a common part of the first covariance matrix and a second covariance matrix, which includes covariance estimates of a second observation time, by using an aid of a Cholesky decomposition of the inverse matrix of the first covariance matrix;
a second estimator configured to estimate interference from a received signal at the second observation time and determine additional covariance components on a basis of the estimating;
a creator configured to create a Cholesky decomposition of an inverse matrix of the second covariance matrix by using unitary rotations; and
a first generator configured to generate an output value of a channel equalizer by utilizing information obtained with an aid of the Cholesky decomposition of the inverse matrix of the second covariance matrix.

12. The apparatus of claim 11, wherein the Cholesky decomposition of the inverse matrix of the first covariance matrix is of a form $$W_p = \begin{pmatrix} \omega_p & \bar{o}^H \\ \omega_p & \Omega_p \end{pmatrix},$$

where $\omega_p$ is a scalar, $\omega_p$ is a vector, $\bar{o}^H$ is a zero vector and $\Omega_p$ is a lower triangular sub-matrix.

13. The equalizer of claim 11, wherein the inverse matrix of the first covariance matrix is partitioned as $$U(n) = \begin{pmatrix} u_p & u_p^H \\ u_p & U_p \end{pmatrix},$$

wherein $u_p$ is a scalar, $u_p$ is a vector, $u_p^H$ is a complex-conjugate transpose vector, $U_p$ is a sub-matrix and H is a complex-conjugate transpose matrix.

14. The equalizer of claim 11, wherein a selection of the covariance components to be removed is based on a size of a sliding step of a signal window.

15. The apparatus of claim 11, wherein additional covariance components are determined as $$\begin{pmatrix} \sigma_f \\ \sigma_f \end{pmatrix} = \left(H(n)\left[\text{diag}\left(1 - \hat{b}^2(n)\right)\right]H^H(n) + I\delta_0^2\right)\begin{pmatrix} 0 \\ 1 \end{pmatrix},$$

wherein $\sigma_f$ is covariance component vector, $\sigma_f$ is a covariance component located in a corner of the second covariance matrix, H(n) is a system matrix in the second observation time, diag is a diagonal matrix, $\hat{b}(n)$ is a symbol estimate, H is a complex conjugate matrix, $\sigma_0^2$ is a noise variance, and I is an interference matrix.

16. The apparatus of claim 11, wherein a computation of the inverse of the sub-matrix $\Sigma$ representing the common part of the two consecutive covariance matrices is defined with an aid of determination $\Sigma^{-1} = \overline{\Omega\Omega}^H$, wherein $\overline{\Omega}$ is a sub-matrix and $\overline{\Omega}^H$ is a complex-conjugate transpose of the sub-matrix.

17. The apparatus of claim 11, wherein Cholesky factorisation of the inverse matrix of the second covariance matrix is defined as $$W_f = \begin{pmatrix} \overline{\Omega} & -\sqrt{u_f}\,\overline{\Omega\Omega}^H \sigma_f \\ \bar{o}^H & \sqrt{u_f} \end{pmatrix}\Theta,$$

wherein $\overline{\Omega}$ is a sub-matrix, $\bar{o}^H$ is a zero vector, $\overline{\Omega}^H$ is a complex-conjugate transpose of a sub-matrix, $u_f = (\sigma_f - \sigma_f^H \overline{\Omega\Omega}^H \sigma_f)$, $\sigma_f$ is a covariance component, $\Theta$ is a series of unitary rotations and H is a complex-conjugate transpose matrix.

18. The apparatus of claim 11, wherein an output signal of an equalizer is generated as $$z_k(n) = \beta_k(n)\left(\alpha_k(n)\hat{b}_k(n) + \eta_k^H(n)W_f^H \tilde{r}(n)\right),$$

wherein $\alpha_k(n) = \eta_k^H(n)\eta_k(n)$, $$\eta_k(n) = W_f^H h_k(n),\ \beta_k(n) = 1 - \frac{\alpha_k(n)}{\alpha_k(n) + |\hat{b}_k(n)|^{-2}},$$

$h_k(n)$ is a channel response vector, n is an nth symbol, H is a complex-conjugate transpose matrix, $\hat{b}_k(n)$ is a symbol estimate based on a channel decoder feedback, $$W_f = \begin{pmatrix} \overline{\Omega} & -\sqrt{u_f}\,\overline{\Omega\Omega}^H \sigma_f \\ \bar{o}^H & \sqrt{u_f} \end{pmatrix}\Theta$$

wherein $\overline{\Omega}$ is a sub-matrix, $\bar{o}^H$ is a zero vector, $\overline{\Omega}^H$ is a complex-conjugate transpose of a sub-matrix, $u_f = (\sigma_f - \sigma_f^H \overline{\Omega\Omega}^H \sigma_f)$, $\sigma_f$ is a covariance component, $\Theta$ is a series of unitary rotations and H is a complex-conjugate transpose matrix, $\tilde{r}(n) = r(n) - H\hat{b}$ where $H_k(n)$ is a channel response matrix and n means an nth symbol.

19. The apparatus of claim 11, further comprising a second generator configured to generate the output value of the channel equalizer by further utilizing a-priori symbol estimate information.

20. An apparatus comprising:
first estimating means for estimating interference from a received signal at a first observation time, creating a first covariance matrix on a basis of the estimating and defining an inverse matrix of the first covariance matrix and a Cholesky decomposition matrix;
removing means for removing selected covariance components from the Cholesky decomposition matrix;
computing means for computing an inverse of a sub-matrix, which represents a common part of the first covariance matrix and a second covariance matrix, which includes covariance estimates of a second observation time, by using an aid of the Cholesky decomposition of the inverse matrix of the first covariance matrix;

second estimating means for estimating interference from a received signal at a second observation time and determining additional covariance components on a basis of the estimating;

creating means for creating a Cholesky decomposition of an inverse matrix of the second covariance matrix by using unitary rotations; and generating means for generating an output value of a channel equalizer by utilizing information obtained with an aid of the Cholesky decomposition of the inverse matrix of the second covariance matrix.

\* \* \* \* \*